US011326628B2

(12) United States Patent
 Kirkbride

(10) Patent No.: US 11,326,628 B2
(45) Date of Patent: May 10, 2022

(54) HYDRAULIC ACTUATION SYSTEM FOR IMPARTING ROTATION

(71) Applicant: THE BOEING COMPANY, Chicago, IL (US)

(72) Inventor: David W. Kirkbride, Allyn, WA (US)

(73) Assignee: THE BOEING COMPANY, Chicago, IL (US)

( * ) Notice: Subject to any disclaimer, the term of this patent is extended or adjusted under 35 U.S.C. 154(b) by 232 days.

(21) Appl. No.: 16/707,531

(22) Filed: Dec. 9, 2019

(65) Prior Publication Data

US 2021/0172461 A1    Jun. 10, 2021

(51) Int. Cl.
 *F15B 11/22*    (2006.01)
 *B64C 13/40*    (2006.01)
 *F15B 1/02*    (2006.01)
 *F15B 11/20*    (2006.01)

(52) U.S. Cl.
 CPC .............. *F15B 11/22* (2013.01); *B64C 13/40* (2013.01); *F15B 1/02* (2013.01); *F15B 11/20* (2013.01); *F15B 2211/212* (2013.01)

(58) Field of Classification Search
 CPC ......... B64C 13/40; B64C 13/30; B64C 13/00; F15B 15/02; F15B 11/22
 See application file for complete search history.

(56) References Cited

U.S. PATENT DOCUMENTS 10,384,764 B2 * 8/2019 Blanc .................... F15B 13/044
10,759,519 B2 * 9/2020 Blanding .............. B64C 13/505

FOREIGN PATENT DOCUMENTS

| DE | 3304487 C1 | 3/1984 | |
| EP | 0529796 A1 * | 3/1993 | .............. F42B 10/64 |
| EP | 3086078 A1 | 10/2016 | |

OTHER PUBLICATIONS

Extended Search Report for EP Application No. 20206398.8 dated May 3, 2021.

* cited by examiner

*Primary Examiner* — Abiy Teka
(74) *Attorney, Agent, or Firm* — Marshall, Gerstein & Borun LLP

(57) ABSTRACT

An actuator system for controlling a control surface of an aircraft, which includes a control structure which defines the control surface and the control structure has an axis of rotation about which the control structure can rotate relative to the aircraft. A first actuator assembly has a first actuator arm and a second actuator assembly has a second actuator arm. The first actuator assembly and the second actuator assembly are spaced apart from one another along the axis of rotation. The first actuator arm is connected to a first band member and the first band member is connected to the control structure on a first side of the axis of rotation and the second actuator arm is connected to a second band member and the second band member is connected to the control structure on a second opposing side of the axis of rotation.

20 Claims, 7 Drawing Sheets

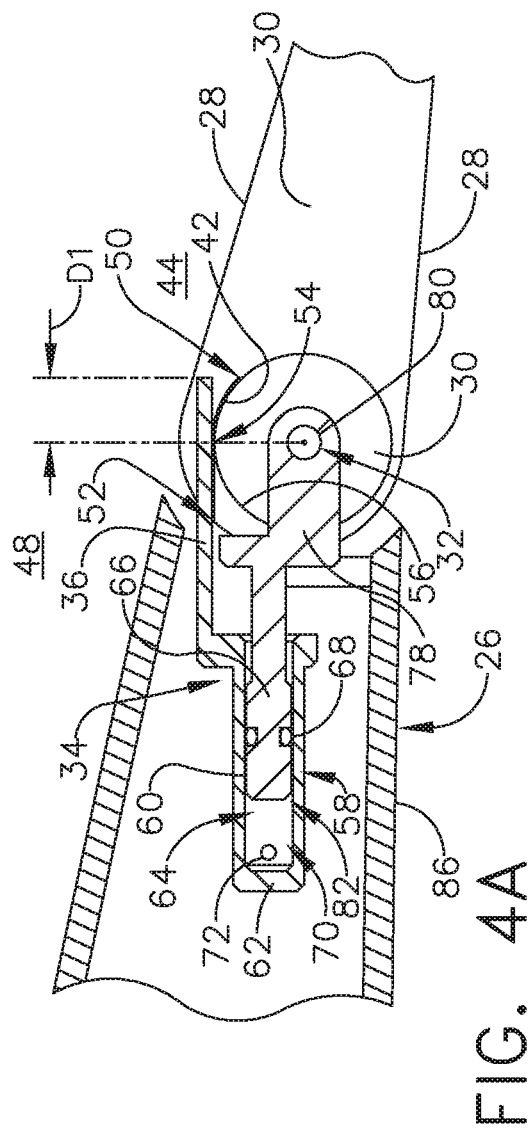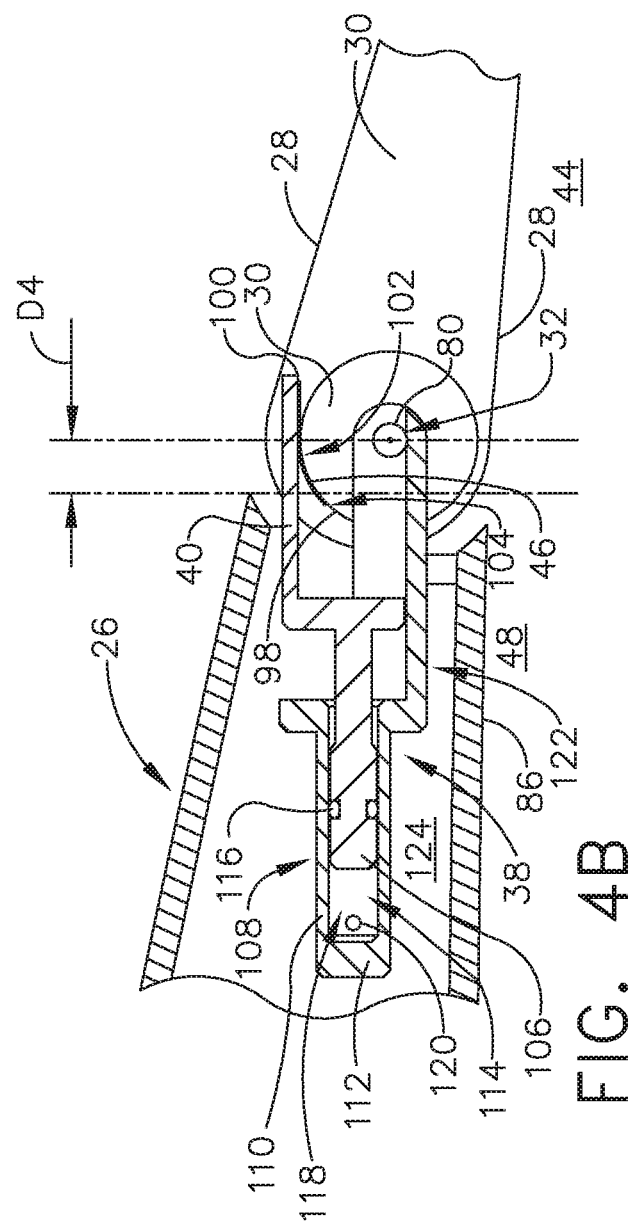

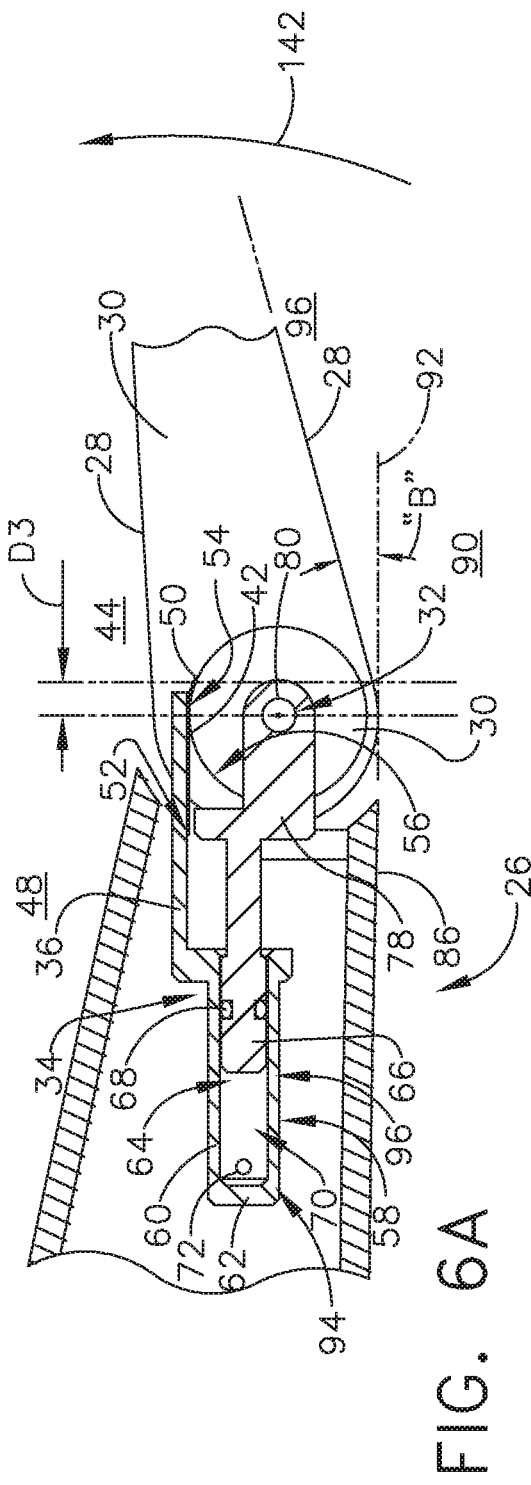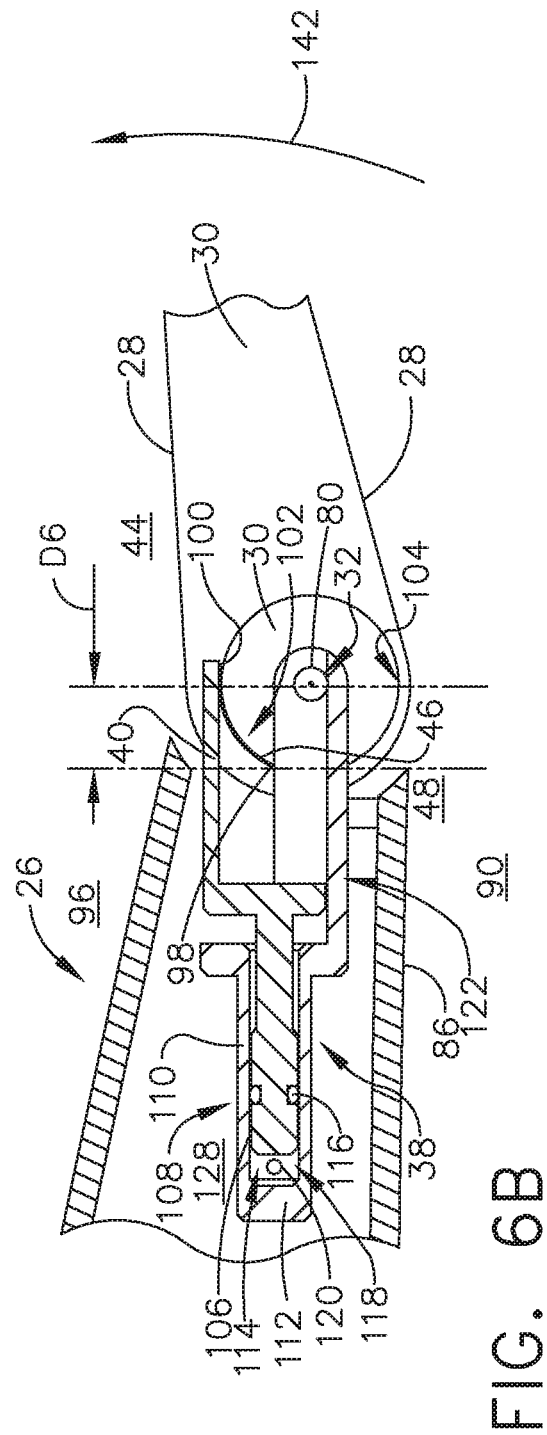

HYDRAULIC ACTUATION SYSTEM FOR IMPARTING ROTATION

FIELD

This disclosure relates to a hydraulic actuator system and more particularly to a hydraulic actuator system that imparts rotation for control surfaces.

BACKGROUND

Control surfaces are utilized to maneuver an aircraft in operation. The control surfaces are often rotated about a hinge joint. The rotation of the control surface has been accomplished by a variety of actuator systems, which include, for example, a rack and pinion actuator. The rack and pinion actuator includes engaging a rotary gear and a linear gear. In operation, the engaging of the rotary gear and the linear gear includes the impact and friction between the rotary and linear gears during operation.

The impact and frictional contact between the gear parts result in wear on the gears. Wear on the gears result in having a less precise interaction between the gears. Control surfaces rely on precise moving of the control surfaces and sustaining a position once the control surface position has been attained for desired operational maneuvering of the aircraft. The wear on the gears reduce precise engagement between the gears. Thus, frictional wear on a drive system, such as a rack and pinion drive system, requires frequent inspections, maintenance and replacement of the actuation system, such as the rack and pinion actuator, over time.

Moreover, actuator systems, for thinner wing aircraft, for example, are needed to operate within less space. Actuator systems such as the rack and pinion actuator system require reduction in size with respect to the rotary and linear gears so as to operate within a more limited space within a thinner wing structure. As a reduction in diameter of the pinion gear occurs, conflicts arise between manufacturing to close tolerances and designing to high gear tooth loads. There is a need to provide actuator systems that control movement and sustain positions of a control surface without encountering design and operational challenges with respect to maintaining close tolerances and handling high gear tooth loads as well as operating within confined space of a thinner wing aircraft.

As a result, there is a need for an actuation system which does not experience unwanted frictional wear in operation and which effects smooth precise operation of and reliability in sustaining desired positions of a control surface. With less frictional wear present within the actuation system, there will be a cost savings related to inspection, maintenance and replacement with respect to the actuation system. In addition, there is a need for an actuation system which will operate within smaller space confinements, such as within thinner wing aircraft, without encountering a conflict with a reduction, for example, in a diameter of a pinion gear with respect to manufacturing of close tolerances and designing to high gear tooth loads.

SUMMARY

An example includes an actuator system for controlling a control surface of an aircraft, which includes a control structure which defines the control surface wherein the control structure has an axis of rotation about which the control structure can rotate relative to the aircraft. A first actuator assembly has a first actuator arm and a second actuator assembly has a second actuator arm. The first actuator assembly and the second actuator assembly are spaced apart from one another along the axis of rotation. The first actuator arm is connected to a first band member and the first band member is connected to the control structure on a first side of the axis of rotation and the second actuator arm is connected to a second band member and the second band member is connected to the control structure on a second opposing side of the axis of rotation.

An example includes a method for controlling a control surface of an aircraft, which includes applying a first force to a first actuator arm of a first actuator assembly and applying a second force to a second actuator arm of a second actuator assembly. A control structure defines the control surface and the control structure has an axis of rotation about which the control structure can rotate relative to the aircraft. The first actuator arm is connected to a first band member and the first band member is connected to the control structure on a first side of the axis of rotation and the second actuator arm is connected to a second band member and the second band member is connected to the control structure on a second opposing side of the axis of rotation. The first actuator assembly and the second actuator assembly are spaced apart from one another along the axis of rotation.

The features, functions, and advantages that have been discussed can be achieved independently in various embodiments or may be combined in yet other embodiments further details of which can be seen with reference to the following description and drawings.

BRIEF SUMMARY OF THE DRAWINGS

FIG. 4A is a cross section view along line 4A-4A of FIG. 3 with control surface in alignment with an adjacent surface of the aircraft;

FIG. 4B is a cross section view along line 4B-4B of FIG. 3 with control surface in alignment with an adjacent surface of the aircraft;

FIG. 6A is a cross section view along line 4A-4A of FIG. 3 with control surface out of alignment with an adjacent surface of the aircraft and is angularly positioned on a second side of the extension of the adjacent surface of the aircraft;

FIG. 6B is a cross section view along line 4B-4B of FIG. 3 with control surface out of alignment with an adjacent surface of the aircraft and is angularly positioned on a second side of the extension of the adjacent surface of the aircraft.

DESCRIPTION

As mentioned earlier, there is a need for an actuation system for controlling a control surface of an aircraft such that an actuation system does not experience unwanted frictional wear in operation, such as is found in a rack and opinion actuation system. Such wear arises with the application of force in the engaging of linear and rotary gears in operation of a rack and pinion gears resulting in friction experienced with respect to the gears. The wear imparted to the rack and pinion actuator system, effects smooth precise operation of a control surface and sustaining desired positions of the control surface. With less frictional wear occurring within an actuator system, there will be a cost savings related to inspection, maintenance and replacement with respect to the actuator system. In addition, there is a need for an actuator system to operate within smaller space confinements, such as within thinner wing aircraft, without encountering a conflict arising with a reduction in diameter of a pinion gear with respect to manufacturing of close tolerances and designing to high gear tooth loads.

Figure 1:
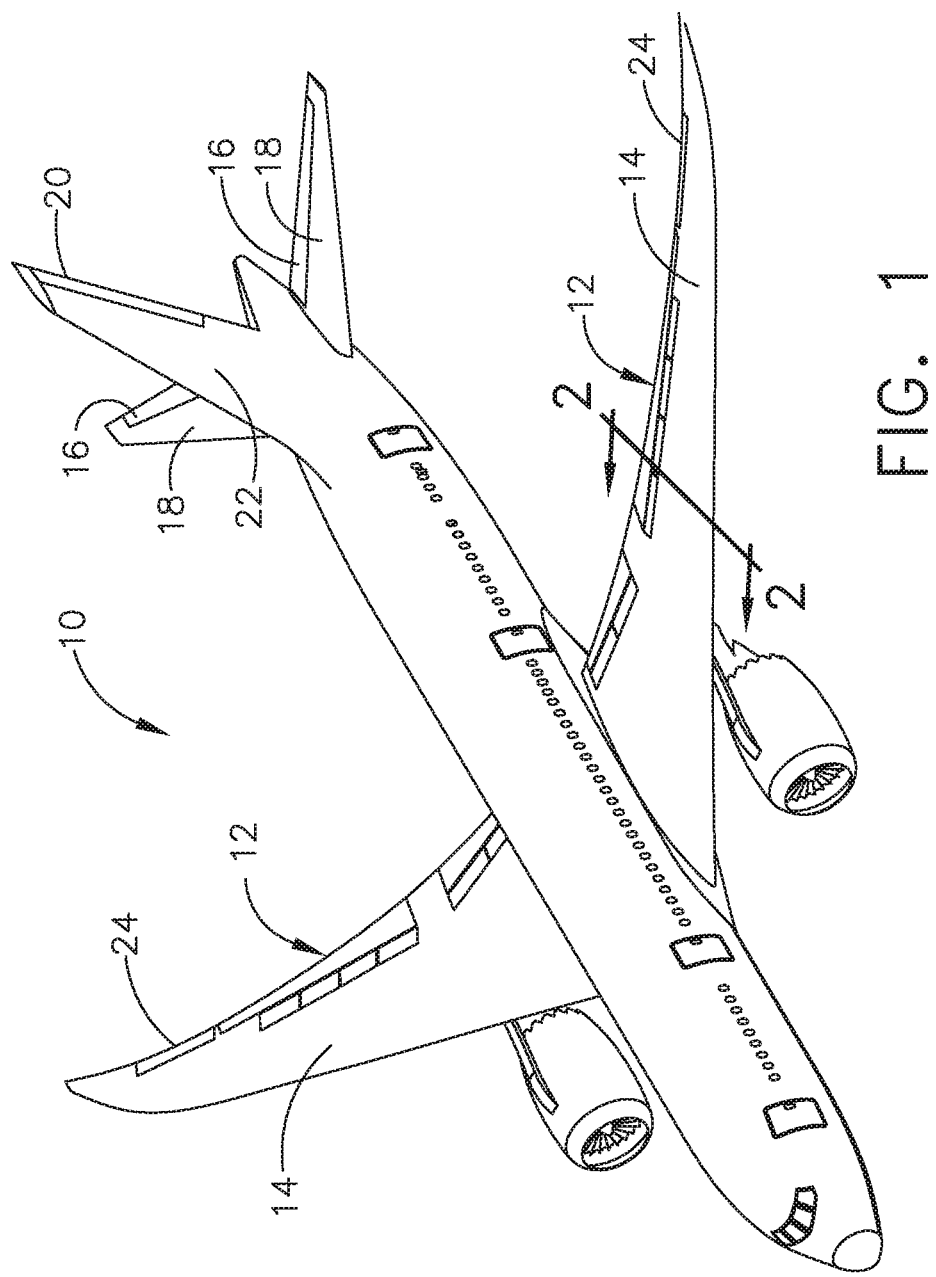
FIG. 1 perspective view of an aircraft.

In referring to FIG. 1, an example of aircraft 10 is shown having a variety of control surfaces for maneuvering aircraft 10 in operation. Control surfaces are positioned on aircraft 10 depending on the type and configuration of aircraft 10. Some of these control surfaces include for example, aileron control surface 12 on wing 14 (also seen in FIG. 2), elevator control surface 16 on horizontal stabilizer 18, rudder control surface 20 on vertical stabilizer 22 and balance tab control surface 24 positioned on wing 14 of aircraft 10. All of these control surfaces have a corresponding control structure which defines the control surface and each control structure is rotatable about an axis of rotation.

Figure 2:
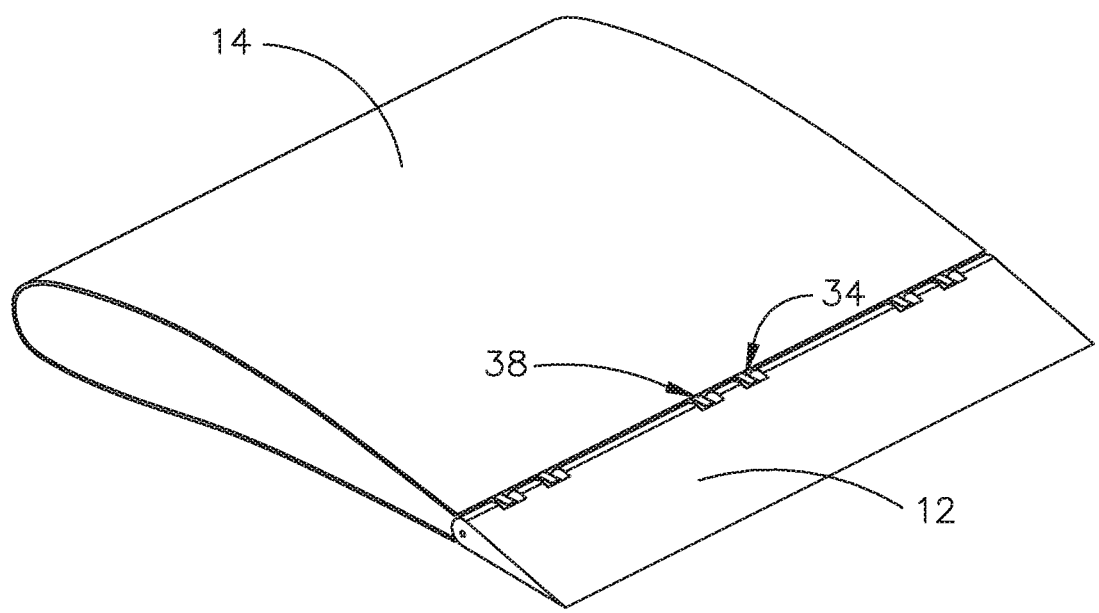
FIG. 2 is a perspective cross section along line 2-2 of FIG. 1.
Figure 3:
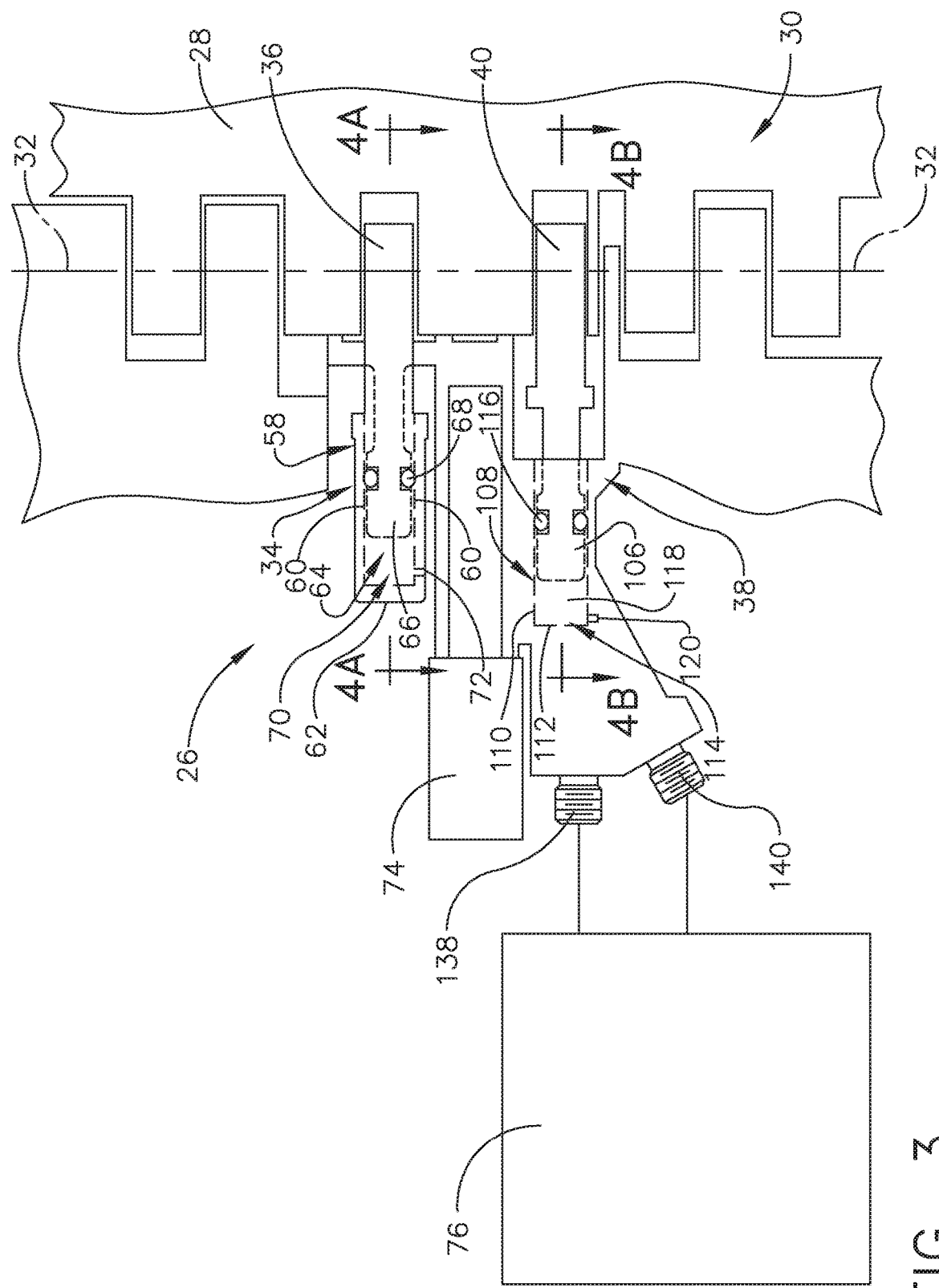
FIG. 3 is schematic plan view of first and second actuator assemblies for controlling a control surface of the aircraft of FIG. 1 powered with an accumulator and further controlled with a four way servo valve.

In referring to FIGS. 3-6B, an actuator system 26 for controlling control surface 28 of aircraft 10 is shown. Control structure 30 defines control surface 28 wherein control structure 30 has an axis of rotation 32 about which control structure 30 can rotate relative to aircraft 10. First actuator assembly 34 has first actuator arm 36 and second actuator assembly 38 has second actuator arm 40. First actuator assembly 34 and second actuator assembly 38 are spaced apart from one another along axis of rotation 32, as seen in FIGS. 2 and 3. First actuator arm 36 is connected to first band member 42 and first band member 42 is connected to control structure 30 on first side 44 of axis of rotation 32 and second actuator arm 40 is connected to second band member 46 and second band member 46 is connected to control structure 30 on second opposing side 48 of axis of rotation 32. First and second band members 42, 46 can be constructed from a variety of materials, such as for example, metal or carbon fiber composite or materials having suitable performance capabilities.

Figure 5A:
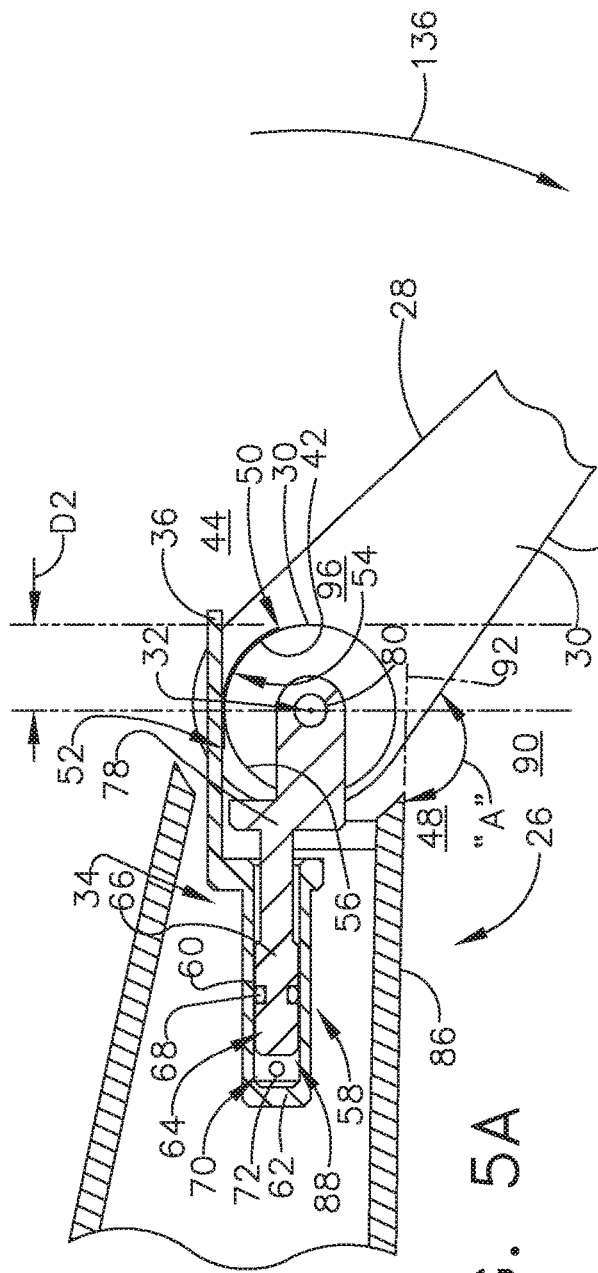
FIG. 5A is a cross section view along line 4A-4A of FIG. 3 with control surface out of alignment with an adjacent surface of the aircraft and is angularly positioned on one side of an extension of the adjacent surface of the aircraft.

As seen in FIGS. 4A, 5A and 6A, first band member 42 has first end portion 50 secured to control structure 30 and has second end portion 52 secured to first actuator arm 36. At least a portion 54 of first band member 42, positioned between first end portion 50 and second end portion 52, is positioned in contact with curved surface 56 of control structure 30. First actuator arm 36 is connected to first cylinder member 58, which includes first sidewall 60 and first end wall 62. First sidewall 60 defines first cylinder opening 64 positioned within and extending along first cylinder member 58. First cylinder opening 64 contains first piston 66 with first seal member 68 positioned about first piston 66 such that a seal is formed between first sidewall 60 and first piston 66. First volume 70 is positioned within first cylinder member 58 and includes bounds within first cylinder member 58 of first piston 66, first end wall 62, first sidewall 60 and first seal member 68. First sidewall 60 of first cylinder member 58 defines first opening 72, which extends through first sidewall 60 and is in fluid communication with first volume 70 which provides hydraulic fluid to be able to pass into or out of first volume 70 through first opening 72.

First opening 72 is in fluid communication with direct drive four way servo valve 74, which provides that hydraulic fluid can pass between first opening 72 and direct drive four way servo valve 74. Direct drive four way servo valve 74 is in fluid communication with accumulator 76 for containing pressurized hydraulic fluid as a result, hydraulic can flow between first volume 70 and accumulator 76. First piston 66 has a first connecting member 78 which engages rotational shaft member 80 wherein rotational shaft member 80 extends along axis of rotation 32. Rotational shaft member 80 and control structure 30 rotate together relative to first connecting member 78.

With first piston 66 positioned in first position 82, as seen in FIG. 4A, relative to first end wall 62 and first band member 42, in this example first end portion 50, is connected to control structure 30 on first side 44 of axis of rotation 32 a first distance D1 from axis of rotation 32, control surface 28 is in alignment with adjacent surface 86 of aircraft 10. In this example, control surface 28 and adjacent surface 86 of aircraft 10 are aligned.

With first piston 66 positioned in second position 88, as seen in FIG. 5A, relative to first end wall 62, wherein in this example, first piston 66 is positioned closer to first end wall 62 than first piston 66 in first position 82 set forth above. First band member 42 is positioned connected to control structure 30 on first side 44 of axis of rotation 32 a second distance D2 from axis of rotation 32, control surface 28 is out of alignment with adjacent surface 86 of aircraft 10 and is angularly positioned, as indicated by angle designation "A", on one side 90 of extension 92 of adjacent surface 86 of aircraft 10. In this example, control surface 28 is in angular relationship, with respect to adjacent surface 86 of aircraft 10.

With the first piston 66 positioned in a third position 94 as seen in FIG. 6B, relative to first end wall 62, wherein in this example, first piston 66 is positioned further away to first end wall 62 than with first piston 66 in first position 82 as set forth above. First band member 42 is positioned connected, in this example first end 50, to control structure 30 on first side 44 of axis of rotation 32 a third distance D3 from the axis of rotation 32, control surface 28 is out of alignment with adjacent surface 86 of aircraft 10 and is angularly positioned, as indicated by angle designation "B" on second opposing side 96 of extension 92 of adjacent surface 86 of aircraft 10. In this example, control surface 28 is in angular relationship with respect to adjacent surface 86 of aircraft 10.

Figure 5B:
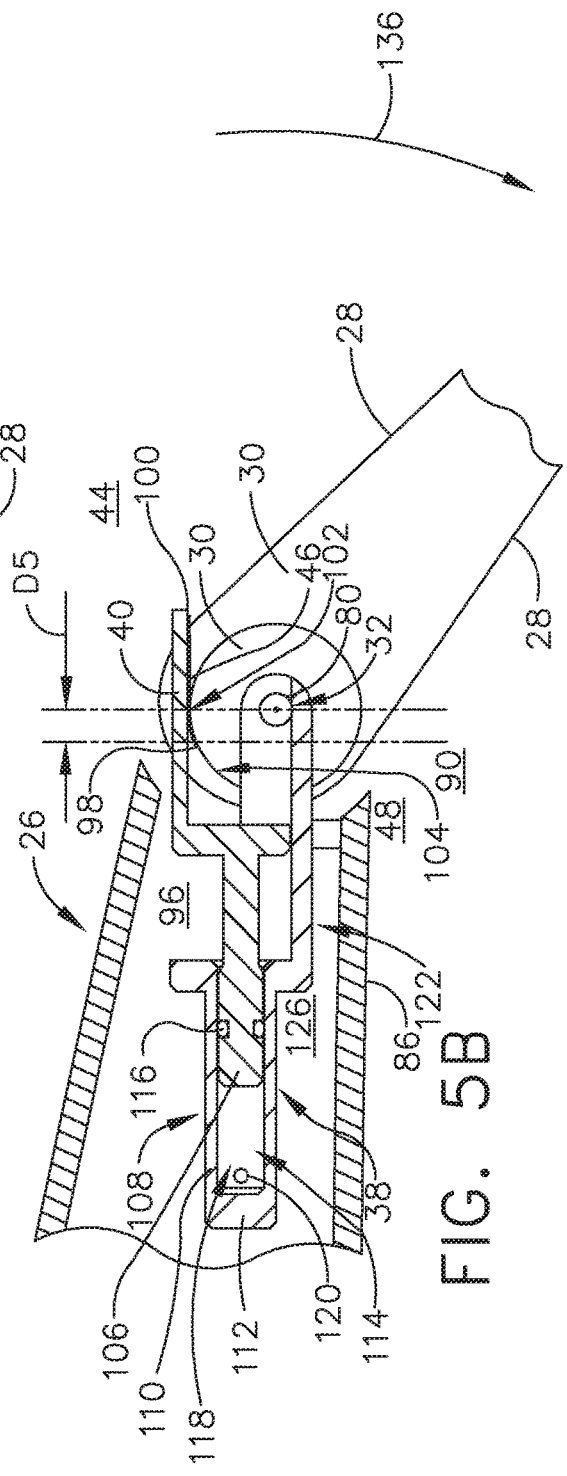
FIG. 5B is a cross section view along line 4B-4B of FIG. 3 with control surface out of alignment with an adjacent surface of the aircraft and is angularly positioned on a second side of an extension of the adjacent surface of the aircraft.

With respect to the second actuator assembly 38, as seen in FIGS. 4B, 5B and 6B, second band member 46 has first end portion 98 secured to control structure 30 and has second end portion 100 secured to second actuator arm 40. At least a portion 102 of second band member 46, positioned between first end portion 98 and second end portion 100, is positioned in contact with curved surface 104 of control structure 30. Second actuator arm 40 is connected to second piston 106. Second piston 106 is positioned within second cylinder member 108, which includes a second sidewall 110 of second cylinder member 108 and second end wall 112. Second sidewall 110 of second cylinder member 108 defines second cylinder opening 114 positioned within and extending along second cylinder member 108. Second seal member 116 is positioned about second piston 106 such that a seal is formed between second sidewall 110 of second cylinder member 108 and second piston 106. Second volume 118 is positioned within second cylinder member 108 and second volume 118 includes bounds of second piston 106, second end wall 112, second sidewall 110 and second seal member 116.

Second sidewall 110 of second cylinder member 108 defines second opening 120, which extends through second sidewall 110 and is in fluid communication with second volume 118 such that hydraulic fluid can pass into or out of second volume 118 through second opening 120. Second opening 120 is in fluid communication with direct drive four way servo valve 74, as seen in FIG. 3, which is in fluid communication with accumulator 76 for containing pressurized hydraulic fluid. Second cylinder member 108 has second connecting member 122, which engages rotational shaft member 80. Rotational shaft member 80 extends along axis of rotation 32 and rotational shaft member 80 and control structure 30 rotate together relative to second connecting member 122.

With second piston 106 positioned in fourth position 124, as seen in FIG. 4B, relative to second end wall 112 and second band member 46 is connected to control structure 30 on second opposing side 48 of axis of rotation 32 at a fourth distance D4 from axis of rotation 32. The control surface 28 is in alignment with adjacent surface 86 of aircraft 10 as earlier discussed with respect to the configuration of control structure 30 and control surface 28 with respect to first actuator assembly 34 shown in FIG. 4A.

With second piston 106 positioned in fifth position 126, as seen in FIG. 5B, relative to second end wall 112 and second band member 46, in this example first end portion 98, is connected to control structure 30 on second opposing side 96 of axis of rotation 32 at a fifth distance D5 from axis of rotation 32, control surface 28 is out of alignment with adjacent surface 86 of aircraft 10 and control surface 28 is angularly positioned on one side 90 of an extension 92 of the adjacent surface 86 of aircraft 10 as similarly shown in FIG. 5A as indicated by angle designation "A" positioned on one side 90 of extension 92 of adjacent surface 86 of aircraft 10. In this example, control surface 28 is in angular relationship with respect to adjacent surface 86 of aircraft 10.

With second piston 106 positioned in sixth position 128, as seen in FIG. 6B, relative to second end wall 112 and second band member 46, in this example first end portion 98, is connected to the control structure 30 on second opposing side 96 of axis of rotation 32 at a sixth distance D6 from axis of rotation 32, control surface 28 is out of alignment with adjacent surface 86 of aircraft 10 as similarly shown in FIG. 6A as indicated by angle designation "B" angularly positioned on second opposing side 96 of extension 92 of adjacent surface 86 of aircraft 10. In this example, control surface 28 is in angular relationship, with respect to adjacent surface 86 of aircraft 10.

Figure 7:
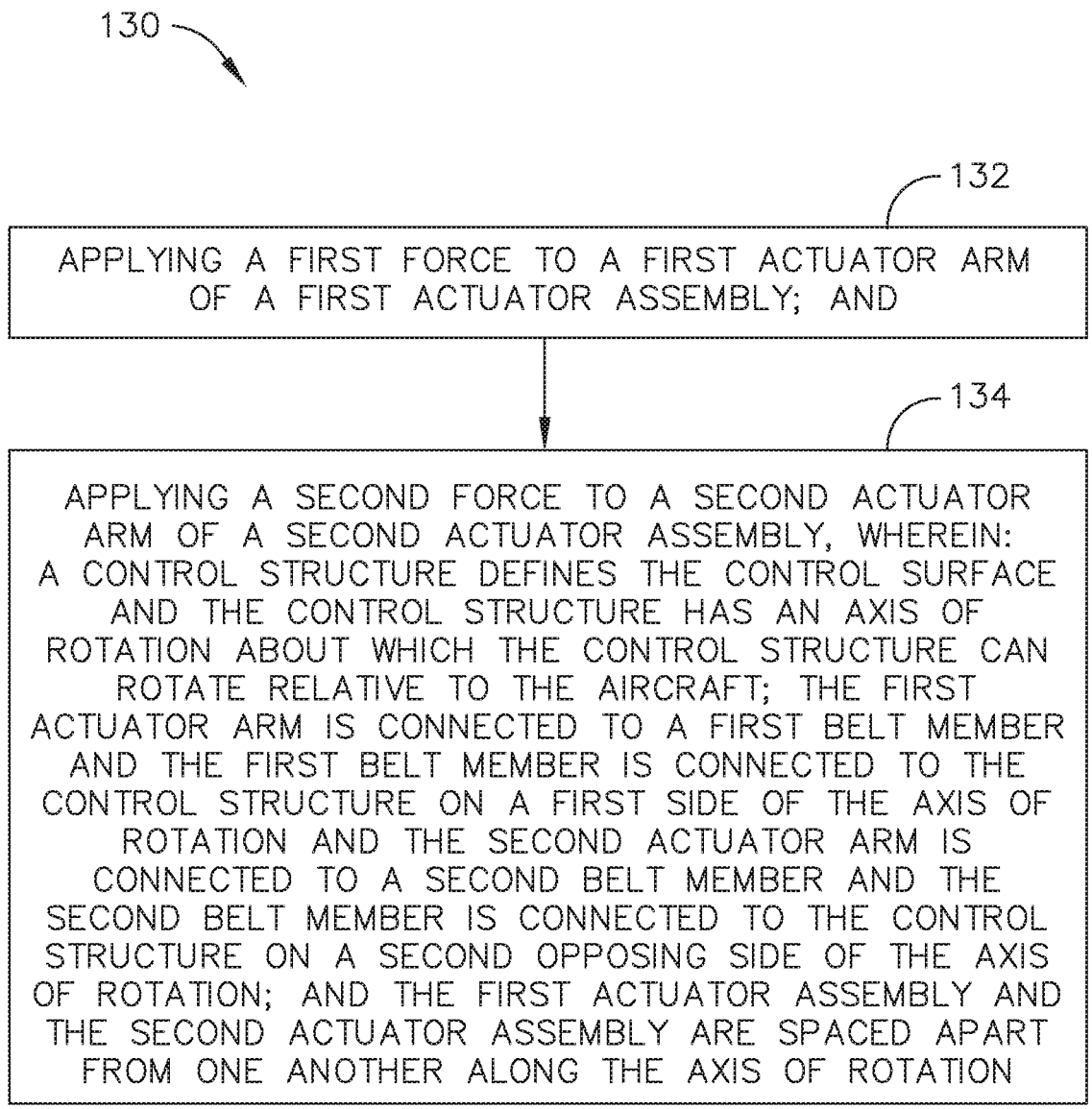
FIG. 7 is a flow chart of a method for controlling a control surface of an aircraft.

In referring to FIG. 7, method 130 for controlling control surface 28 of aircraft 10 includes applying a first force to first actuator arm 36 of first actuator assembly 34 and applying a second force to second actuator arm 40 of second actuator assembly 38. As will be further understood herein, first force and second force are of the same amount with maintaining control structure 30 and control surface 28 in a static position and they are different for rotating the control structure 30 and control surface 28 in a desired direction. Control structure 30 defines control surface 28 and control structure 30 has an axis of rotation 32 about which control structure 30 rotates relative to aircraft 10. First actuator arm 36 is connected to first band member 42 and first band member 42, in this example first end portion 50, is connected to control structure 30 on a first side 44 of axis of rotation 32 and second actuator arm 40, in this example first end portion 98, is connected to second band member 46 and second band member 46 is connected to control structure 30 on a second opposing side 48 of axis of rotation 32. First actuator assembly 34 and second actuator assembly 38 are spaced apart from one another along axis of rotation 32.

As earlier described, first actuator arm 36 is connected to first cylinder member 58 which includes first sidewall 60 and first end wall 62 with first sidewall 60 defining first cylinder opening 64 positioned within and extending along first cylinder member 58. First cylinder opening 64 contains first piston 66 with first seal member 68 positioned about first piston 66 such that a seal is formed between first sidewall 60 and first piston 66. First volume 70 includes bounds within first cylinder member 58 of first piston 66, first end wall 62, first sidewall 60 and first seal member 68.

Second actuator arm 40, as discussed earlier, is connected to second piston 106 and second piston 106 is positioned within second cylinder member 108, which includes second sidewall 110 of second cylinder member 108 and second end wall 112. Second sidewall 110 of second cylinder member 108 defines second cylinder opening 114 positioned within and extending along second cylinder member 108. Second seal member 116 is positioned about second piston 106 such that a seal is formed between second sidewall 110 of second cylinder member 108 and second piston 106. Second volume 118 includes bounds within second cylinder member 108 of second piston 106, second end wall 112, second sidewall 110 of second cylinder member 108 and second seal member 116.

In method 130 maintaining control structure 30 and control surface 28 in a static position, such as seen, for example in FIGS. 4A and 4B, includes maintaining equal fluid hydraulic pressure within first volume 70 and second volume 118 such that the first force applied to the first actuator arm 36 by the fluid hydraulic pressure in first volume 70 and the second force applied to the second actuator arm 40 by the fluid hydraulic pressure in second volume 118 provides a same tension force on the first band member 42 and on the second band member 46, respectively. This equalized tension force applied to first and second band members 42, 46 maintains control structure 30 and control surface 28 in a desired static position.

Control structure 30 and control surface 28 is rotated about axis of rotation 32 in a first direction 136, as seen in FIGS. 5A and 5B, from a position as seen in FIGS. 4A and 4B to, for example, a position as seen in FIGS. 5A and 5B. Rotation of control structure 30 and control surface 28 in first direction 138 is accomplished with providing a first fluid hydraulic pressure within first volume 70 which applies the first force to first actuator arm 36 and providing a second fluid hydraulic pressure within second volume 118 applies the second force to second actuator arm 40. In this example, a hydraulic fluid pressure circuit is positioned between accumulator 76 and first and second actuator assemblies 34 and 38. Pressurized hydraulic fluid enters inlet 138 as seen in FIG. 3 and then into direct drive four way servo valve 74. Direct drive four way servo valve 74 directs differing pressured hydraulic fluid to first volume 70 and second volume 118 of first and second actuator assemblies 34 and 38, respectively as needed. Pressurized hydraulic fluid can return from first volume 70 and second volume 118 of the first and second actuator assemblies 34 and 38, respectively, through direct drive four way servo valve 74 and exit outlet 140 back to accumulator 76.

For example, in moving of control structure 30 and control surface 28 in first direction 138, direct drive four way servo valve 74 pressurizes first volume 70 and second volume 118 as needed. In this example, pressurized hydraulic fluid enters through first opening 72 and places a hydraulic pressure within first volume 70 which is lower than the pressurization hydraulic fluid with second volume 118, from transmission of hydraulic pressure through second opening 120 from direct drive four way servo valve 74. As a result of the first force applied to first actuator arm 36 and the second force applied to second arm actuator 40 a lower tension force is applied to first band member 42 than a tension force applied to second band member 46.

As a result, control structure 30 is rotated in first direction 136, as seen in FIGS. 5A and 5B with second actuator arm 40 extending outwardly away from axis of rotation 32 toward first side 44 and first actuator arm 36 follows second actuator arm 40 toward the first side 44 however at the same time maintaining a tension on first band member 42. This operation does not impart impact or friction wear on first or second band members 42, 46 in winding or unwinding first band member 42 on curved surface 56 of control structure 30 and second band member 46 on curved surface 104 of control structure 30. When a desired position of control structure 30 and control surface 28 is attained, direct drive four way servo valve 74 supplies first volume 70 and second volume 118 with equalized pressure sustaining the position of control structure 30 and control surface 28.

Alternatively, control structure 30 and control surface 28 is rotated about axis of rotation 32 in second direction 142, as seen in FIGS. 6A and 6B. For example, direct drive four way servo valve 74 pressurizes first volume 70 and second volume 118. In this example, pressurized hydraulic fluid enters through first opening 72 and places the third fluid hydraulic pressure within first volume 70 which is greater than a fourth hydraulic pressure placed within second volume 118 through second opening 120 from direct drive four way servo valve 74.the third hydraulic pressure applies the first force to first actuator arm 36 and the fourth fluid hydraulic pressure applies the second force to second actuator arm 40, wherein the third fluid hydraulic pressure is higher than the fourth fluid hydraulic pressure such that a higher tension force is applied to first band member 42 than a tension force applied to second band member 46.

As a result, control structure 30 is rotated in second direction 142, as seen in FIGS. 6A and 6B with first actuator arm 36 retracting in second opposing side 48 direction away from axis of rotation 32 and second actuator arm 40 follows first actuator arm 36 toward second opposing side 48 however at the same time maintaining tension on second band member 46. This operation does not impart impact or friction wear on first or second band members 42, 46 in winding or unwinding first band member 42 on curved surface 56 of control structure 30 and second band member 46 on curved surface 104. When a desired position of control structure 30 and control surface 28 is attained, direct drive four way servo valve 74 supplies first volume 70 and second volume 118 with equalized hydraulic pressure sustaining the position of control structure 30 and control surface 28.

While various embodiments have been described above, this disclosure is not intended to be limited thereto. Variations can be made to the disclosed embodiments that are still within the scope of the appended claims.

What is claimed:

1. An actuator system for controlling a control surface of an aircraft, comprising:
   a control structure defines the control surface wherein the control structure has an axis of rotation about which the control structure can rotate relative to the aircraft;
   a first actuator assembly has a first actuator arm;
   a second actuator assembly has a second actuator arm, wherein:
      the first actuator assembly and the second actuator assembly are spaced apart from one another along the axis of rotation; and
      the first actuator arm is connected to a first band member, wherein:
         the first band member has a first end portion secured to the control structure and has a second end portion secured to the first actuator arm;
         at least a portion of the first band member, positioned between the first end portion and the second end portion, is positioned in contact with a curved surface of the control structure;
         the first band member is connected to the control structure on a first side of the axis of rotation;
         the second actuator arm is connected to a second band member; and
         the second band member is connected to the control structure on a second opposing side of the axis of rotation.

2. The actuator system of claim 1, wherein the first actuator arm is connected to a first cylinder member which includes a first sidewall and a first end wall.

3. The actuator system of claim 2, wherein:
   the first sidewall defines a first cylinder opening positioned within and extending along the first cylinder member;
   the first cylinder opening contains a first piston with a first seal member positioned about the first piston such that a seal is formed between the first sidewall and the first piston; and
   a first volume includes bounds within the first cylinder member of the first piston, the first end wall, the first sidewall and the first seal member.

4. The actuator system of claim 3, the first sidewall of the first cylinder member defines a first opening, which extends through the first sidewall and is in fluid communication with the first volume such that hydraulic fluid can pass into or out of the first volume through the first opening.

5. The actuator system of claim 1, wherein the second actuator arm is connected to a second piston.

6. The actuator system of claim 5, wherein:
   the second piston is positioned within a second cylinder member, which includes a second sidewall of the second cylinder member and a second end wall;
   the second sidewall of the second cylinder member defines a second cylinder opening positioned within and extending along the second cylinder member;
   a second seal member is positioned about the second piston such that a seal is formed between the second sidewall of the second cylinder member and the second piston; and
   a second volume is positioned within the second cylinder member and the second volume includes bounds of the second piston, the second end wall, the second sidewall and the second seal member.

7. The actuator system of claim 6, wherein the second sidewall of the second cylinder member defines a second opening, which extends through the second sidewall and is in fluid communication with the second volume such that hydraulic fluid can pass into or out of the second volume through the second opening.

8. The actuator system of claim 6, wherein:
with the second piston positioned in a fourth position relative to the second end wall and the second band member is connected to the control structure on a second opposing side of the axis of rotation at a fourth distance from the axis of rotation, the control surface is in alignment with an adjacent surface of the aircraft; or
with the second piston positioned in a fifth position relative to the second end wall and the second band member is connected to the control structure on the second opposing side of the axis of rotation at a fifth distance from the axis of rotation, the control surface is out of alignment with an adjacent surface of aircraft and the control surface is angularly positioned on one side of an extension of the adjacent surface of the aircraft; or
with the second piston positioned in a sixth position relative to the second end wall and the second band member is connected to the control structure on the second opposing side of the axis of rotation at a sixth distance from the axis of rotation, the control surface is out of alignment with an adjacent surface of the aircraft and is angularly positioned on a second opposing side of the extension of the adjacent surface of the aircraft.

9. The actuator system of claim 1, wherein:
the second band member has a first end portion secured to the control structure and has a second end portion secured to the second actuator arm; and
at least a portion of the second band member, positioned between the first end portion and the second end portion, is positioned in contact with a curved surface of the control structure.

10. An actuator system for controlling a control surface of an aircraft, comprising:
a control structure defines the control surface wherein the control structure has an axis of rotation about which the control structure can rotate relative to the aircraft;
a first actuator assembly has a first actuator arm, wherein:
the first actuator arm is connected to a first cylinder member which includes a first sidewall and a first end wall;
the first sidewall defines a first cylinder opening positioned within and extending along the first cylinder member;
the first cylinder opening contains a first piston with a first seal member positioned about the first piston such that a seal is formed between the first sidewall and the first piston;
a first volume includes bounds within the first cylinder member of the first piston, the first end wall, the first sidewall and the first seal member;
the first sidewall of the first cylinder member defines a first opening, which extends through the first sidewall and is in fluid communication with the first volume such that hydraulic fluid can pass into or out of the first volume through the first opening; and
the first opening is in fluid communication with a direct drive four way servo valve, which is in fluid communication with an accumulator for containing pressurized hydraulic fluid; and a second actuator assembly has a second actuator arm, wherein:
the first actuator assembly and the second actuator assembly are spaced apart from one another along the axis of rotation;
the first actuator arm is connected to a first band member;
the first band member is connected to the control structure on a first side of the axis of rotation;
the second actuator arm is connected to a second band member; and
the second band member is connected to the control structure on a second opposing side of the axis of rotation.

11. The actuator system of claim 10, wherein:
the first piston has a first connecting member, which engages a rotational shaft member, wherein the rotational shaft member extends along the axis of rotation; and
the rotational shaft member and the control structure rotate together relative to the first connecting member.

12. The actuator system of claim 10, wherein:
with the first piston positioned in a first position relative to the first end wall and the first band member is connected to the control structure on the first side of the axis of rotation a first distance from the axis of rotation, the control surface is in alignment with an adjacent surface of the aircraft; or
with the first piston positioned in a second position relative to the first end wall and the first band member is positioned connected to the control structure on the first side of the axis of rotation a second distance from the axis of rotation, the control surface is out of alignment with the adjacent surface of the aircraft and is angularly positioned on one side of an extension of the adjacent surface of the aircraft; or
with the first piston positioned in a third position relative to the first end wall and the first band member is positioned connected to the control structure on the first side of the axis of rotation a third distance from the axis of rotation, the control surface is out of alignment with the adjacent surface of the aircraft and is angularly positioned on a second opposing side of the extension of the adjacent surface of the aircraft.

13. An actuator system for controlling a control surface of an aircraft, comprising:
a control structure defines the control surface wherein the control structure has an axis of rotation about which the control structure can rotate relative to the aircraft;
a first actuator assembly has a first actuator arm;
a second actuator assembly has a second actuator arm, wherein:
the first actuator assembly and the second actuator assembly are spaced apart from one another along the axis of rotation;
the first actuator arm is connected to a first band member;
the first band member is connected to the control structure on a first side of the axis of rotation;
the second actuator arm is connected to a second band member; and
the second band member is connected to the control structure on a second opposing side of the axis of rotation, wherein:

the second band member has a first end portion secured to the control structure and has a second end portion secured to the second actuator arm; and at least a portion of the second band member, positioned between the first end portion and the second end portion, is positioned in contact with a curved surface of the control structure.

14. An actuator system for controlling a control surface of an aircraft, comprising:
a control structure defines the control surface wherein the control structure has an axis of rotation about which the control structure can rotate relative to the aircraft;
a first actuator assembly has a first actuator arm;
a second actuator assembly has a second actuator arm, wherein:
the first actuator assembly and the second actuator assembly are spaced apart from one another along the axis of rotation; and
the first actuator arm is connected to a first band member;
the first band member is connected to the control structure on a first side of the axis of rotation;
the second actuator arm is connected to a second band member; and
the second band member is connected to the control structure on a second opposing side of the axis of rotation, wherein:
the second actuator arm is connected to a second piston;
the second piston is positioned within a second cylinder member, which includes a second sidewall of the second cylinder member and a second end wall;
the second sidewall of the second cylinder member defines a second cylinder opening positioned within and extending along the second cylinder member;
a second seal member is positioned about the second piston such that a seal is formed between the second sidewall of the second cylinder member and the second piston;
a second volume is positioned within the second cylinder member and the second volume includes bounds of the second piston, the second end wall, the second sidewall and the second seal member;
the second sidewall of the second cylinder member defines a second opening, which extends through the second sidewall and is in fluid communication with the second volume such that hydraulic fluid can pass into or out of the second volume through the second opening; and
the second opening is in fluid communication with a direct drive four way servo valve, which is in fluid communication with an accumulator for containing pressurized hydraulic fluid.

15. An actuator system for controlling a control surface of an aircraft, comprising:
a control structure defines the control surface wherein the control structure has an axis of rotation about which the control structure can rotate relative to the aircraft;
a first actuator assembly has a first actuator arm;
a second actuator assembly has a second actuator arm, wherein:
the first actuator assembly and the second actuator assembly are spaced apart from one another along the axis of rotation; and the first actuator arm is connected to a first band member;
the first band member is connected to the control structure on a first side of the axis of rotation;
the second actuator arm is connected to a second band member; and
the second band member is connected to the control structure on a second opposing side of the axis of rotation, wherein:
the second actuator arm is connected to a second piston;
the second piston is positioned within a second cylinder member, which includes a second sidewall of the second cylinder member and a second end wall;
the second sidewall of the second cylinder member defines a second cylinder opening positioned within and extending along the second cylinder member;
a second seal member is positioned about the second piston such that a seal is formed between the second sidewall of the second cylinder member and the second piston;
a second volume is positioned within the second cylinder member and the second volume includes bounds of the second piston, the second end wall, the second sidewall and the second seal member;
the second sidewall of the second cylinder member defines a second opening, which extends through the second sidewall and is in fluid communication with the second volume such that hydraulic fluid can pass into or out of the second volume through the second opening;
the second cylinder member has a second connecting member, which engages a rotational shaft member;
the rotational shaft member extends along the axis of rotation; and
the rotational shaft member and the control structure rotate together relative to the second connecting member.

16. A method for controlling a control surface of an aircraft, comprising:
applying a first force to a first actuator arm of a first actuator assembly; and
applying a second force to a second actuator arm of a second actuator assembly, wherein:
a control structure defines the control surface and the control structure has an axis of rotation about which the control structure can rotate relative to the aircraft;
the first actuator arm is connected to a first band member, wherein:
the first band member has a first end portion secured to the control structure and has a second end portion secured to the first actuator arm;
at least a portion of the first band member, positioned between the first end portion and the second end portion, is positioned in contact with a curved surface of the control structure;
the first band member is connected to the control structure on a first side of the axis of rotation;
the second actuator arm is connected to a second band member;
the second band member is connected to the control structure on a second opposing side of the axis of rotation; and the first actuator assembly and the second actuator assembly are spaced apart from one another along the axis of rotation.

17. The method of claim 16, wherein:
the first actuator arm is connected to a first cylinder member which includes a first sidewall and a first end wall with the first sidewall defining a first cylinder opening positioned within and extending along the first cylinder member;
the first cylinder opening contains a first piston with a first seal member positioned about the first piston such that a seal is formed between the first sidewall and the first piston; and
a first volume includes bounds within the first cylinder member of the first piston, the first end wall, the first sidewall and the first seal member.

18. The method of claim 17, wherein:
the second actuator arm is connected to a second piston;
the second piston is positioned within a second cylinder member, which includes a second sidewall of the second cylinder member and a second end wall;
the second sidewall of the second cylinder member defines a second cylinder opening positioned within and extending along the second cylinder member;
a second seal member is positioned about the second piston such that a seal is formed between the second sidewall of the second cylinder member and the second piston; and
a second volume includes bounds within the second cylinder member of the second piston, the second end wall, the second sidewall of the second cylinder member and the second seal member.

19. The method of claim 18, wherein maintaining the control structure and the control surface in a static position includes maintaining an equal fluid hydraulic pressure within the first volume and the second volume such that the first force applied to the first actuator arm by and the second force applied to the second actuator arm provides a same tension force on the first band member and on the second band member respectively.

20. The method of claim 18, wherein:
the control structure and the control surface is rotated about the axis of rotation in a first direction with providing a first fluid hydraulic pressure within the first volume which applies the first force to the first actuator arm and providing a second fluid hydraulic pressure within the second volume which applies the second force to the second actuator arm, wherein the first fluid hydraulic pressure is lower than the second fluid hydraulic pressure such that a lower tension force is applied to the first band member than a tension force applied to the second band member; or
the control structure and the control surface is rotated about the axis of rotation in a second direction with providing a third fluid hydraulic pressure within the first volume which applies the first force to the first actuator arm and providing a fourth fluid hydraulic pressure within the second volume which applies the second force to the second actuator arm, wherein the third fluid hydraulic pressure is higher than the fourth fluid hydraulic pressure such that a higher tension force is applied to the first band member than a tension force applied to the second band member.

* * * * *